United States Patent
Simmons et al.

(10) Patent No.: US 8,899,637 B2
(45) Date of Patent: Dec. 2, 2014

(54) ROUND BALER TAILGATE LATCH

(75) Inventors: Scott C. Simmons, Lititz, PA (US); John H. Merritt, New Holland, PA (US); Robert D. Crandall, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 465 days.

(21) Appl. No.: 13/188,169

(22) Filed: Jul. 21, 2011

(65) Prior Publication Data
US 2013/0020811 A1    Jan. 24, 2013

(51) Int. Cl.
*E05B 15/00* (2006.01)
*A01F 15/07* (2006.01)
*A01D 39/00* (2006.01)

(52) U.S. Cl.
CPC ......... *A01F 15/07* (2013.01); *A01F 2015/0785* (2013.01)
USPC ...... 292/254; 292/201; 292/332; 292/341.16; 292/341.17; 100/88; 56/341; 298/23 B

(58) Field of Classification Search
USPC .......... 100/88; 292/332, 336, 341.15–341.17, 292/95, 96–98, 100, 121–124, 126, 194, 292/195–197, 201, 219–224, 226, 243, 254, 292/300, 303, 304, DIG. 29, DIG. 43; 56/341, 449, 474–480; 298/23 A, 23 B; 296/6, 57.1; 49/280, 394
See application file for complete search history.

(56) References Cited

U.S. PATENT DOCUMENTS

| | | | | |
|---|---|---|---|---|
| 1,743,094 A | * | 1/1930 | Barrett | 298/38 |
| 2,211,195 A | * | 8/1940 | Biszantz | 298/23 B |
| 2,475,753 A | * | 7/1949 | Nordberg et al. | 105/384 |
| 2,514,726 A | * | 7/1950 | Schonrock | 298/38 |
| 2,552,442 A | * | 5/1951 | McClish | 298/23 M |
| 2,672,808 A | * | 3/1954 | Eldert | 100/188 R |
| 2,675,268 A | * | 4/1954 | Hutchinson | 298/23 B |
| 2,764,874 A | * | 10/1956 | Sharpe | 62/161 |
| 2,777,315 A | * | 1/1957 | Burke | 70/144 |
| 2,828,140 A | * | 3/1958 | Hassell | 280/145 |
| 2,865,313 A | * | 12/1958 | Morehouse | 109/63.5 |
| 3,129,955 A | * | 4/1964 | Hassell | 280/145 |
| 3,272,552 A | | 9/1966 | Park | |
| 3,640,560 A | * | 2/1972 | Zawadzki et al. | 292/341.16 |
| 3,901,142 A | * | 8/1975 | Wood | 100/255 |
| 3,995,899 A | * | 12/1976 | Tippy et al. | 292/254 |
| 4,307,541 A | | 12/1981 | Farmer et al. | |
| 4,321,787 A | * | 3/1982 | Holdeman et al. | 56/341 |
| 4,343,511 A | * | 8/1982 | Rowan et al. | 298/6 |
| 4,386,493 A | * | 6/1983 | Holdeman et al. | 56/341 |
| 4,389,930 A | | 6/1983 | Rutschilling | |
| 4,407,190 A | | 10/1983 | Cheatum | |
| 4,665,649 A | | 5/1987 | Hund, Jr. | |

(Continued)

FOREIGN PATENT DOCUMENTS

DE    019941604 C1    10/2000

*Primary Examiner* — Kristina Fulton
*Assistant Examiner* — Alyson M Merlino
(74) *Attorney, Agent, or Firm* — Patrick M. Sheldrake; Seyed V. Sharifi T.

(57) ABSTRACT

A tailgate latching mechanism for a round bale that utilizes action of the tailgate lift cylinders to release the latch to allow the tailgate to be opened and an independent spring action to cause the mechanism to catch and latch the tailgate into position upon closure of the tailgate.

13 Claims, 4 Drawing Sheets

(56) References Cited

U.S. PATENT DOCUMENTS

| | | | |
|---|---|---|---|
| 4,802,604 A | 2/1989 | Lindsey | |
| 5,080,408 A * | 1/1992 | McBay | 292/254 |
| 5,129,750 A * | 7/1992 | Otsuki | 400/690.4 |
| 5,203,153 A | 4/1993 | Van Zee et al. | |
| 5,598,690 A * | 2/1997 | McClure et al. | 56/341 |
| 5,816,766 A | 10/1998 | Clark | |
| 6,193,295 B1 | 2/2001 | Stragier | |
| 6,539,851 B1 | 4/2003 | Wilkens et al. | |
| 6,843,170 B1 * | 1/2005 | Guthmann et al. | 100/35 |
| 7,520,215 B1 | 4/2009 | Merritt | |

\* cited by examiner

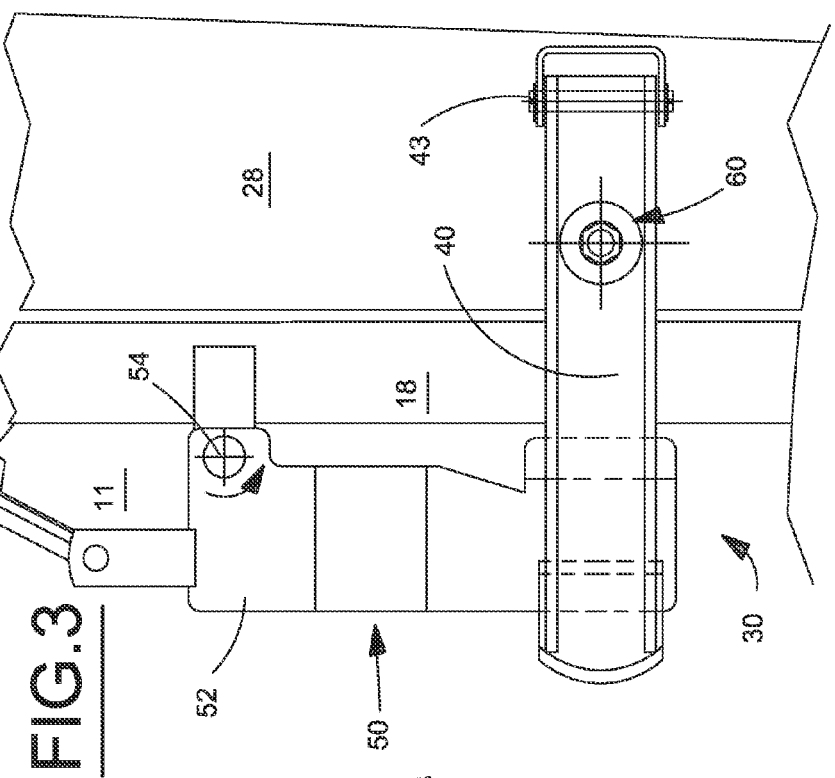
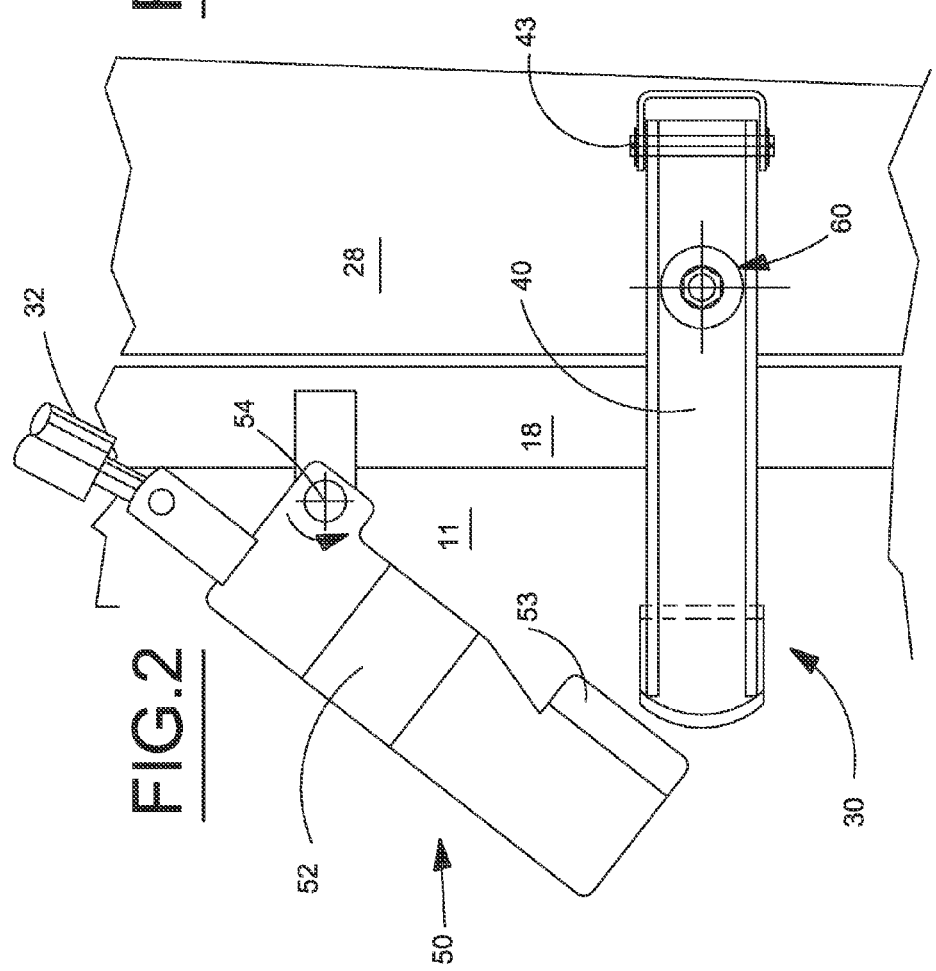

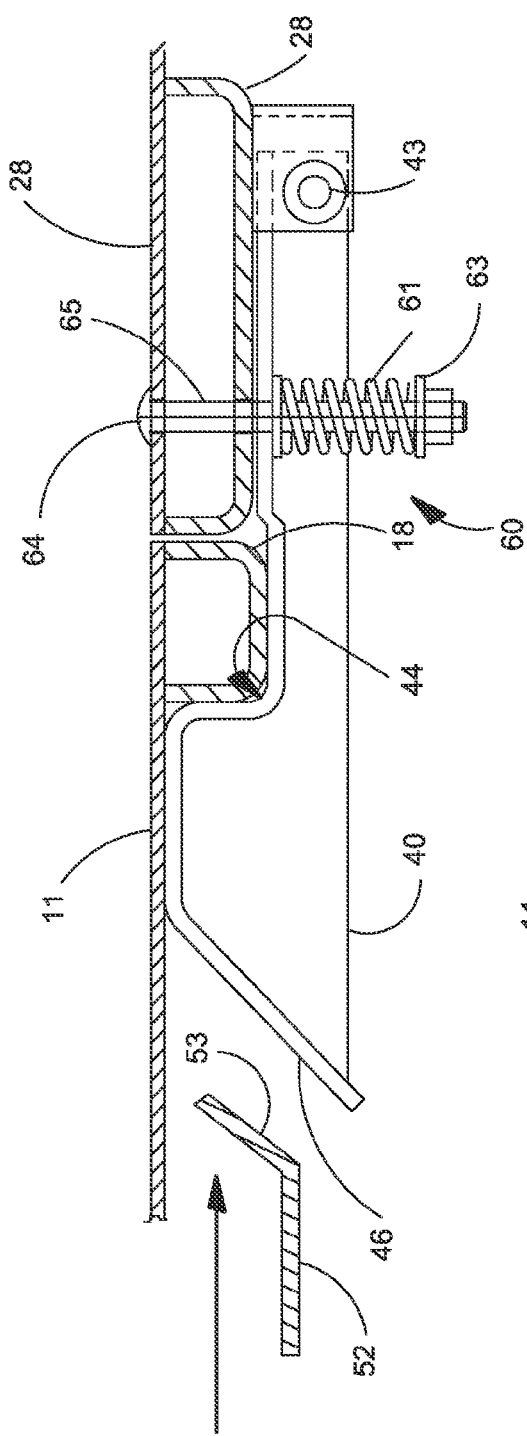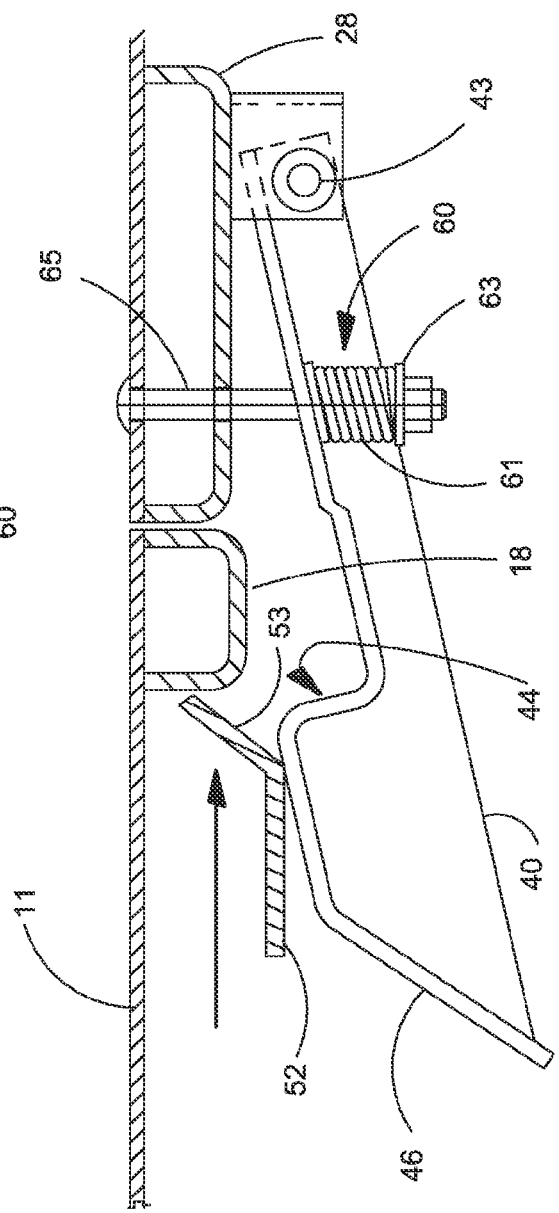

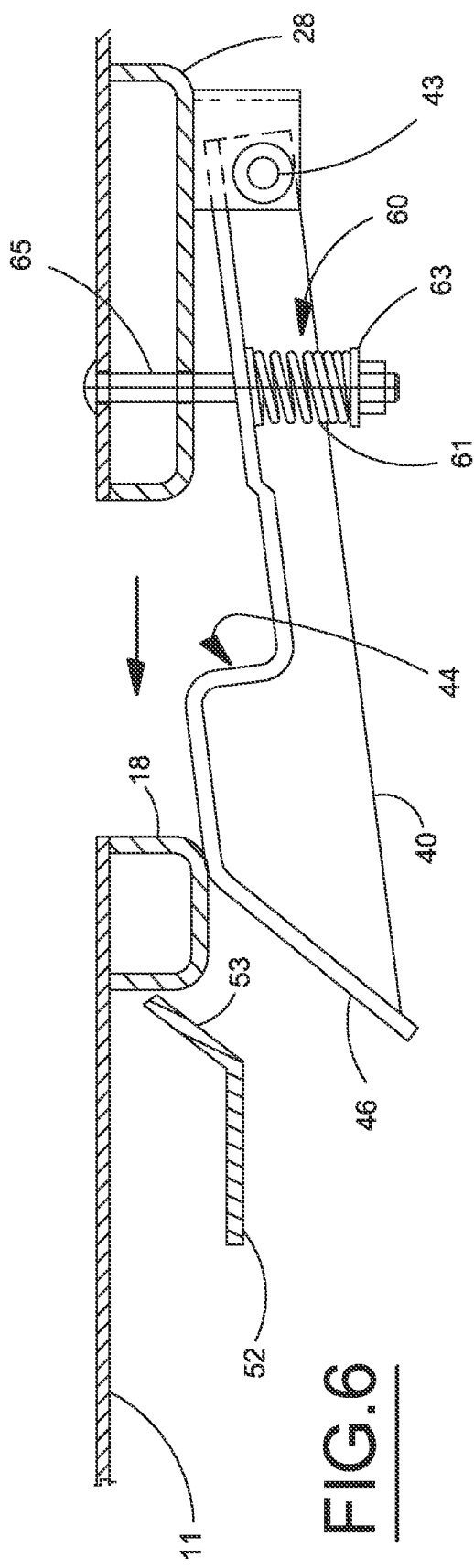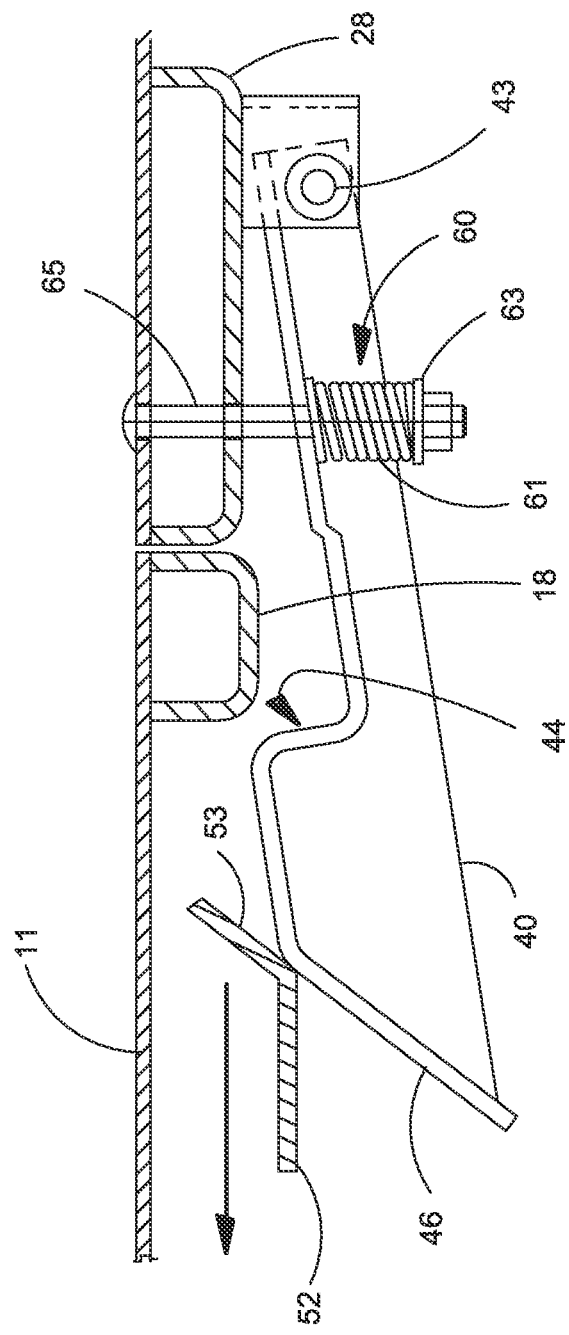

ROUND BALER TAILGATE LATCH

BACKGROUND OF THE INVENTION

The present invention, relating generally to an agricultural baler for forming cylindrical bales of crop material, commonly referred to as a round baler, is directed to an improved tailgate latching apparatus. More particularly, this invention is directed toward an improved round baler tailgate latching apparatus that reduces the likelihood malfunction or damage during tailgate latching and unlatching operations.

For many years agricultural balers have been used to consolidate and package crop material so as to facilitate the storage and handling of the crop material for later use. Usually, a mower-conditioner cuts and conditions the crop material for windrow drying in the sun. When the cut crop material is properly dried, a baler is pulled along the windrows to pick up the crop material and form it into conveniently sized and shaped round bales. More specifically, the windrow pickup of the baler gathers the cut and windrowed crop material and lifts it into the baling chamber. In a round baler, the baling chamber consists of a pair of opposing sidewalls with a series of belts that rotate and compress the crop material into a cylindrical shape. When the bale has achieved a desired size and density, the operator wraps the bale to ensure that the bale maintains its shape and density. The operator then raises the tailgate of the baler and ejects the bale onto the ground. The tailgate is then closed and the cycle repeated as necessary and desired to manage the field of cut crop material. The utilization of rolls in combination with belts is shown by way of example in the round baler of U.S. Pat. No. 4,870,812, by Richard E. Jennings, et al., which is incorporated in its entirety herein by reference.

It is common practice to use a latching assembly to maintain a round baler tailgate in the closed position during bale formation in the chamber. Prior art latching mechanisms experienced, under certain crop conditions, excessive stress on the tailgate pivot pins when the hydraulic cylinder, employed to hold the latch in place during operation, exerts a force on the latch pin. This stress is applied as a rotational force on the tailgate pivot pins. Concurrently, a lateral force is incumbent on the tailgate during bale formation as the package of crop material expands within the chamber. Thus, the latch pin, which is being forced downwardly, transmits a downward force to the entire tailgate, which in turn produces the deleterious rotational force mentioned above, while at the same time a lateral force is being applied to the pivot pins, all of which could cause stress and ultimate fatigue if left uncorrected.

An improved latching mechanism designed to improve tailgate latching performance is disclosed in U.S. Pat. No. 7,520,215, by John H. Merritt, the descriptive portions of which are incorporated herein by reference. The Merritt reference discloses an adjustable tailgate latching mechanism for a round baler utilizing a movable arcuate hook-like latch catching structure attached to the latching mechanism that enables proper alignment of the tailgate latch to be established and maintained. Latching and unlatching movement of the mechanism is synchronized with and controlled by movement of the tailgate lift cylinder.

Experience with the improved tailgate latch mechanism shows that the latches remained prone to bending upon tailgate closure. Excessive variation in the relative position of elements of the latching mechanisms of the tailgate latches become problematic when latch movement in both the latching and the unlatching direction is synchronized with and controlled by the tailgate lift cylinder. As a result, the tailgate may be prevented from securely latching in a closed position for baling, opening to discharge a completed bale, or be subjected to excessive stresses. Correcting the misalignment is typically performed by grinding portions of the latching mechanism to obtain the proper fit or re-mounting tailgate latch pins to correct the misalignment. Such actions require significant effort. Furthermore, if misalignment in the tailgate latching mechanism occurs as a result of wear in the baler, correcting the problem generally means that the baler must be removed from operation, a correction that is rarely convenient to perform.

It would be a great advantage to provide a more durable tailgate latch mechanism for a round baler that features latching that is independent of the tailgate lift cylinders during tailgate closure, but requires hydraulic pressure in the lift cylinders to release the latching mechanism and allow tailgate opening overcomes the above-identified problems and disadvantages.

SUMMARY OF THE INVENTION

Accordingly, the present invention, in any of the embodiments described herein, may provide one or more of the following advantages:

It is an object of the present invention to provide a tailgate latch mechanism for a round bale that operates independent of the tailgate lift cylinders for closure, but relies on hydraulic pressure in the lift cylinders to release the latching mechanism to allow tailgate opening.

It is a further object of the present invention to provide a tailgate latch mechanism for a round bale wherein a spring-loaded mechanism latched and locks the tailgate in a closed position thereby enabling a greater range in the relative position tolerances of the latch and latch pins.

It is a further object of the present invention to provide a tailgate latch mechanism for a round baler that that relies on the tailgate lift cylinders to release the latch thereby eliminating the need for a separate, dedicated release actuator device.

It is a still further object of the present invention to provide a tailgate latch mechanism that normally requires minimal adjustment, but when necessary, such adjustment may be easily performed using simple hand tools.

It is a still further object of the present invention to provide a tailgate latch mechanism for a round baler that is durable in construction, inexpensive of manufacture, carefree of maintenance, easily assembled, and simple and effective to use.

These and other objects are achieved by providing a tailgate latching mechanism for a round bale that utilizes action of the tailgate lift cylinders to release the latch and allow the tailgate to be opened and an independent spring action to cause the mechanism to catch and latch the tailgate into position upon closure of the tailgate.

BRIEF DESCRIPTION OF THE DRAWINGS

The advantages of this invention will be apparent upon consideration of the following detailed disclosure of the invention, especially when taken in conjunction with the accompanying drawings wherein:

FIG. 2 is side elevation view of one embodiment of the tailgate latch mechanism shown in the latched position;

FIG. 3 is a side elevation view of the latch mechanism of FIG. 2 shown as the mechanism has unlatched the tailgate;

FIG. 4 is a partial plan view of the latch mechanism positioned as shown in FIG. 2;

FIG. 5 is a partial plan view of the latch mechanism positioned as shown in FIG. 3;

FIG. 6 is a partial plan view of the latch mechanism positioned as the tailgate is being closed; and FIG. 7 is a partial plan view of the latch mechanism positioned as the tailgate is closed but prior to the latch engaging.

DESCRIPTION OF THE PREFERRED EMBODIMENT(S)

Figure 1:
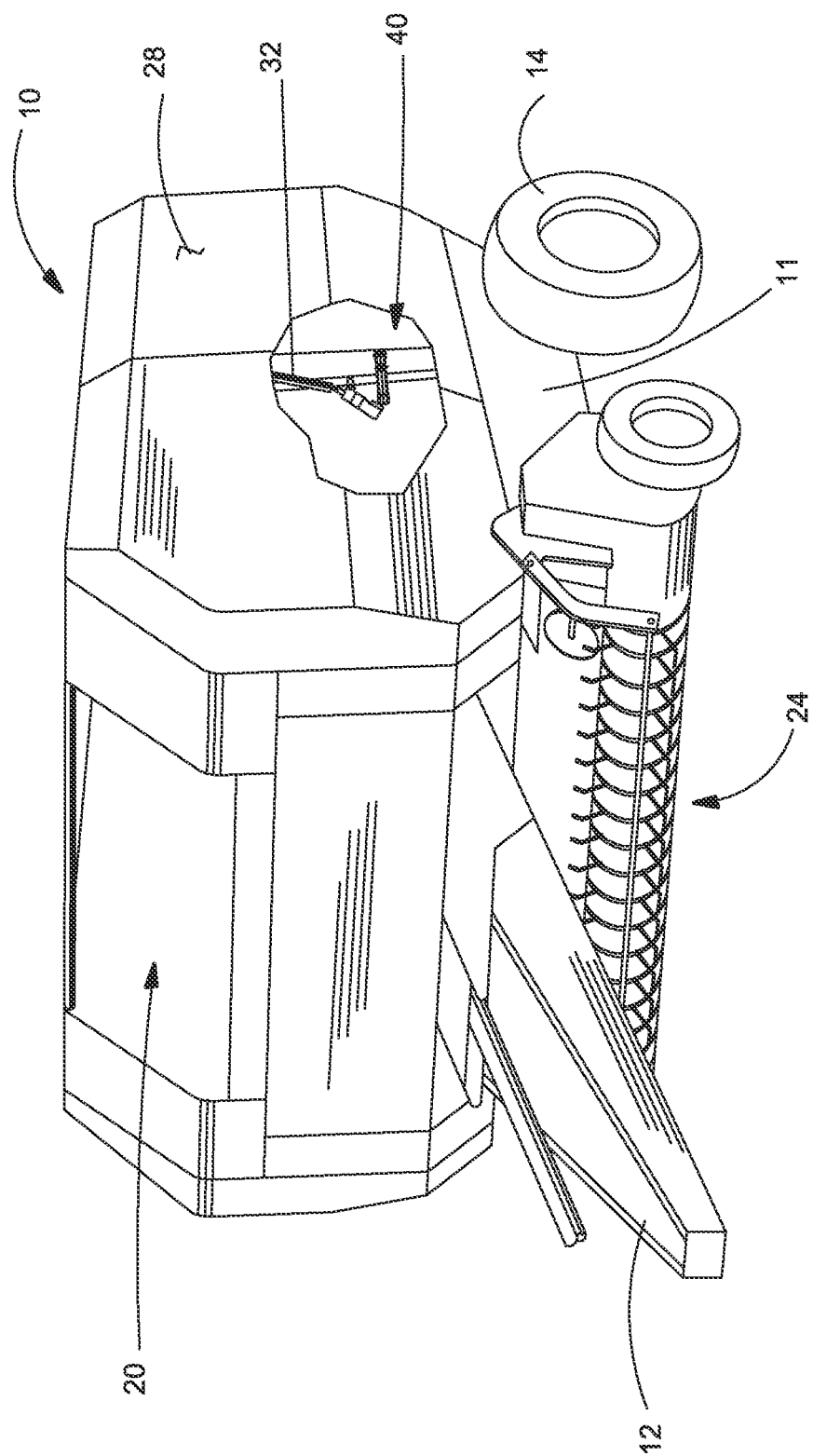
FIG. 1 is an isometric view of a round baler of the type on which the adjustable latching mechanism of the present invention is useful.

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right," "up" or "down," or "top" or "bottom" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Referring to FIG. 1, a generally well-known round baler 10, with which the tailgate latch mechanism of the present invention can be used is shown to comprise a main frame 11 terminating forwardly in a tongue 12 and rearwardly slightly beyond a transverse axle to which a pair of wheels 14 (only one shown) are mounted, thus forming a wheel supported main frame (not shown in detail). The main frame 11 supports a series of belts and rolls (not shown) which together with a pair of generally opposing and spaced-apart sidewalls establish a bale-forming chamber 20. Cut crop material is picked up by transverse pickup 24 and fed into bale-forming chamber 20 where it is, as discussed above, formed into a cylindrically shaped bale. It is then wrapped with twine or a wrapping material to maintain the bale shape once discharged from the baler. Upon completion of the wrapping process, latch mechanism 30 (only one side shown) is released, tailgate 28 is pivoted upwardly by operation of hydraulic tailgate lift cylinder 32 (only one side shown), and the bale is ejected onto the ground.

FIGS. 2 through 7 provide a detailed view of the tailgate latch mechanism 30 of the present invention, shown in a latched (FIGS. 2 and 4), as the mechanism is moved to unlatch the tailgate (FIGS. 3 and 5), and as the mechanism moved to latch as the tailgate is closed (FIGS. 6 and 7). A left side latch 30 is shown; a mirror image latch is disposed on the right side of the baler to engage the right side of the tailgate. The latch mechanism 30 includes an elongate latch arm 40 which is pivotally coupled at one end to the round baler tailgate 28 by latch pivot 43. The latch pivot 43 is aligned to allow the opposite end of latch arm 40 to pivot generally outwardly away from the frame structure of the tailgate 28 to which it is connected. A spring assembly 60 interconnects an intermediate point on the latch arm 40 and the tailgate 28 structure to bias the latch arm 40 toward a first position generally adjacent to a side wall portion of the tailgate 28 and the side wall of the baler chassis 11. Latch arm 40 also comprises a catch 44 and a disengaging edge 46 disposed adjacent to the end opposite of the pivot 43. Catch 44 is configured to engage a retainer 18 which is affixed to the baler chassis side wall 11 when the latch mechanism is in the latched position to prevent rearward (opening) movement of the tailgate 28. The disengaging edge 46 is angled from the longitudinal axis of the latch arm.

The spring assembly 60 comprises a spring element 61, preferably a coil spring having opposing ends, a guide 65, and opposing stops 63, 64 arranged to capture the spring element 61. Guide 65 extends through an aperture in the latch arm 40. A first stop 64 is anchored to the tailgate 28 while the opposing second stop 63 restrains one end of the spring element 61. Spring element 61 is positioned between second stop 63 and the latch arm 40 in a manner that compresses the spring element 61 therebetween as the latch arm pivots outwardly from the side of the baler.

Tailgate latch mechanism 30 also includes a release bracket 50 comprising a release arm 52 which is pivotally connected to the side wall of the baler chassis at release pivot 54. Release arm 52 also includes a strike plate 53 which interacts with the disengaging edge 46 of the latch arm 40 during the unlatching operation. The strike plate 53 is angled, preferably generally similarly to the angle of the disengaging edge so that as the strike plate 53 is moved into contact (shown by the directional arrows in FIGS. 4 and 5) the generally linear movement of the strike plate 53 will result in pivotal movement of the latch arm 40. The release bracket 50 is pivoted about release pivot 54 by action of the tailgate lift cylinder 32. When the lift cylinder 32 is in a retracted position, such as when the tailgate is closed, the release bracket is pivoted toward a first position (shown in FIGS. 2 and 4) which disengages the release bracket 50 from interaction with the latch arm 40.

Opening of tailgate 30 is initiated by extending tailgate lift cylinder 32. As the tailgate lift cylinder 32 begins to extend to open the tailgate, the release arm 52 is first pivoted toward a second position by motion of the tailgate lift cylinder 32, shown in FIGS. 3 and 5. No movement of the tailgate 28 occurs as the release arm 52 initially pivots. The pivoting motion of the release arm 52 causes the strike plate 53 to contact the disengaging edge 46 of the latch arm 40 and force the disengaging edge 46 end of the latch arm 40 to move outwardly against the force of the spring assembly 60 away from the baler wall to a point at which the catch 44 no longer engages the retainer 18. The release arm 52 continues to pivot until contacting the retainer 18 or other movement limiting structure on the baler so that pivotal motion is limited to an amount sufficient to disengage the latch catch 44 from the retainer 18. Once the release bracket ceases to pivot, further extension of the tailgate lift cylinder 32 causes the tailgate to being opening as it is no longer restrained by the latch mechanism. As the tailgate opens further, the spring assembly 60 forces the latch arm back into contact with the tailgate 28 structure as the latch arm moves beyond contact with the retainer 18.

As the tailgate is closed, the release arm 52 remains positioned as shown in FIGS. 3 and 6 with the release arm 52 in contact with the retainer 18. As the tailgate approaches the closed position, shown in FIG. 6, the latch arm 40 approaches the portion of the latching mechanism 30 fixed on the side wall of the baler frame 11. Disengaging edge 46 first contacts the retainer 18 whereupon the angled alignment of the disengaging edge 46 in contact with the retainer causes the latch arm 40 to pivot outwardly, away from the baler wall against the biasing force of the spring assembly 60. Further closing movement of the tailgate 28 brings the disengaging edge 46 into contact with the release arm 52 which further outwardly angles the latch arm 40 so that it is no longer in contact with the retainer 18. As the tailgate 28 reaches a fully closed position, further retraction of the tailgate lift cylinder 32 causes the release arm 52 to pivot (clockwise as shown in FIGS. 2 and 3) withdrawing the strike plate 53 on the release arm 52 from contact with the disengaging edge 46 thereby allowing the latch arm 40 to pivot inwardly until the catch 44 engages the retainer 18. Motive force for the pivoting movement of the latch arm 40 is solely a result of the spring assembly 60.

Reliability of the latch mechanism 30 is improved by diversifying the motive force for release/opening and closing/latching the latch mechanism. Using the force of the hydraulic tailgate lift cylinders 32 to release the latch mechanism 30 and a spring force to return the latch mechanism 30 to a latched position allows greater flexibility in the position tolerance of the latch mechanism components and improves tailgate latching reliability. Associating the unlatching operation with the tailgate lift cylinder operation eliminates the need for a separate actuator and control system to operate the latch. A single actuator (or simultaneously controlled pair) releases the latch mechanism and opens the tailgate.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

Having thus described the invention, what is claimed is:

1. In an agricultural round baler having a bale-forming chamber, a rearwardly disposed tailgate movable between opposing open and closed positions, an actuator for selectively moving the tailgate, and a latch mechanism for selectively securing the tailgate in the closed position, the improvement in said latching mechanism comprising:
an elongate latch arm having a first end pivotally connected to the tailgate, said latch arm having a catch surface and a release surface disposed generally adjacent to a second end generally opposing said first end, said latch arm pivotable about a first axis between a latched position and a released position;
a release arm connected to a side of the baler adjacent to said latch arm and configured for pivotal movement about a second axis between first and second positions; and
a spring assembly connected to said latch arm and biasing said latch arm toward said latched position;
said latch arm and said release arm being configured such that when said latch, arm is in the latched position, movement of said release arm toward said first position causes said release arm to contact said release surface and move said latch arm toward said released position; and
wherein said first axis and said second axis are non-parallel.

2. The improvement of claim 1, wherein said latch arm ends define a longitudinal axis therebetween and said first axis is generally perpendicular thereto.

3. The improvement of claim 2, wherein said release surface is angled with respect to said latch arm longitudinal axis.

4. The improvement of claim 3, wherein said release arm further comprises an angled striker configured to contact said release surface and cause pivotal movement of said latch arm.

5. In an agricultural round baler having a forward end, an opposing rear end and opposing first and second sides, a bale-forming chamber, a rearwardly disposed tailgate movable between opposing open and closed positions, an actuator for selectively moving the tailgate, and a latch mechanism for selectively securing the tailgate in the closed position, the improvement in said latching mechanism comprising:
an elongate latch arm having a first end pivotally connected to the tailgate, said latch arm having a catch surface and a release surface disposed generally adjacent to a second end generally opposing said first end, said latch arm pivotable about a first axis between a latched position and a released position;
a release arm connected to one of said sides adjacent to said latch arm and configured for pivotal movement about a second axis between generally opposing first and second positions, said pivotal movement controlled by the actuator; and
a spring assembly interconnecting said latch arm and the tailgate in a manner biasing said latch arm toward said latched position;
said latch arm and said release arm being configured such that when the latch arm is in the latched position, movement of said release arm toward said first position causes said release arm to contact said release surface and move said latch arm toward said released position, and movement of said release arm toward said second position allows said spring assembly to move said latch arm toward said latched position;
wherein said latch arm ends define a longitudinal axis therebetween and said first axis is generally perpendicular thereto;
wherein said release surface is angled with respect to said latch arm longitudinal axis;
wherein said release arm further comprises an angled striker configured to contact said release surface and cause pivotal movement of said latch arm; and wherein said first axis and said second axis are non-parallel.

6. The improvement of claim 5, wherein said catch surface is configured to engage a retainer on one of the sides when said latch arm is in the latched position thereby securing the tailgate in the closed position.

7. The improvement of claim 6, further comprising two said latching mechanisms, one disposed on either side of the baler.

8. A tailgate latch mechanism for a tailgate of an agricultural round baler, the tailgate selectively movable with respect to a frame of the baler between open and closed positions by a tailgate actuator, said latch mechanism comprising:
an elongate latch arm having a first end pivotally mounted to the tailgate, said latch arm having a catch surface and a release surface disposed generally adjacent to a second end generally opposing said first end, said latch arm pivotable about a first axis between a latched position and a released position with respect to a retainer mounted to a side wall of the frame;
a release arm connected to the side wall of the frame and configured for pivotal movement about a second axis between generally opposing first and second positions, said release arm positioned generally adjacent to said latch arm when the tailgate is in the closed position, said release arm pivotal movement controlled by the tailgate actuator; and
a spring assembly connected to said latch arm biasing said latch arm toward said latched position;
wherein said latch arm and said release arm are configured such that when said latch arm is in the latched position, movement of said release arm toward said first position causes said release arm to contact said release surface and move said latch arm away from engagement with the retainer on the side wall of the frame and toward said released position thereby allowing the tailgate to be opened, and movement of said release arm toward said second position allows said spring assembly to move said latch arm toward said latched position for engagement with the retainer when the tailgate is in the closed position.

9. The latch mechanism of claim 8, wherein said latch arm ends define a longitudinal axis therebetween and said first axis is generally perpendicular thereto.

10. The latch mechanism of claim 9, wherein said catch surface is configured to engage said retainer on the side wall of the frame when said latch arm is in the latched position thereby securing the tailgate in the closed position.

11. The latch mechanism of claim 10, wherein said release surface is angled with respect to said latch arm longitudinal axis.

12. The latch mechanism of claim 11, wherein said release arm further comprises an angled striker configured to contact said release surface and cause pivotal movement of said latch arm.

13. The latch mechanism of claim 8, wherein said first axis and said second axis are non-parallel.

* * * * *